(12) United States Patent
Jarmon et al.

(10) Patent No.: US 8,739,547 B2
(45) Date of Patent: Jun. 3, 2014

(54) GAS TURBINE ENGINE JOINT HAVING A METALLIC MEMBER, A CMC MEMBER, AND A CERAMIC KEY

(75) Inventors: David C. Jarmon, Kensington, CT (US); Shaoluo L. Butler, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 25 days.

(21) Appl. No.: 13/167,143

(22) Filed: Jun. 23, 2011

(65) Prior Publication Data

US 2012/0328366 A1   Dec. 27, 2012

(51) Int. Cl.
*F23R 3/54* (2006.01)
*F23R 3/44* (2006.01)
*F23R 3/60* (2006.01)

(52) U.S. Cl.
USPC .............. 60/753; 60/796; 60/798; 60/760

(58) Field of Classification Search
USPC ........... 60/752, 753, 754, 755, 756, 757, 758, 60/759, 760, 796, 797, 798, 799, 800
See application file for complete search history.

(56) References Cited

U.S. PATENT DOCUMENTS

| | | | | |
|---|---|---|---|---|
| 2,135,118 A | * | 11/1938 | Stewart | 52/396.1 |
| 3,860,359 A | * | 1/1975 | De Feo | 415/208.2 |
| 3,887,299 A | | 6/1975 | Profant | |
| 3,952,504 A | * | 4/1976 | Sedgwick | 60/753 |
| 4,008,978 A | | 2/1977 | Smale | |
| 4,363,208 A | | 12/1982 | Hoffman et al. | |
| 4,398,866 A | | 8/1983 | Hartel et al. | |
| 4,406,023 A | * | 9/1983 | Harris | 623/23.29 |
| 4,441,324 A | * | 4/1984 | Abe et al. | 60/753 |
| 4,480,436 A | * | 11/1984 | Maclin | 60/796 |
| 4,514,865 A | * | 5/1985 | Harris | 606/62 |
| 4,573,320 A | | 3/1986 | Kralick | |
| 4,626,461 A | | 12/1986 | Prewo et al. | |
| 4,695,283 A | * | 9/1987 | Aldinger | 623/23.24 |
| 4,759,687 A | | 7/1988 | Miraucourt et al. | |
| 4,795,472 A | * | 1/1989 | Crowninshield et al. | 623/23.29 |
| 4,808,186 A | * | 2/1989 | Smith | 623/23.33 |
| 4,888,022 A | * | 12/1989 | Huebsch | 623/23.19 |
| 4,898,122 A | * | 2/1990 | Black | 122/6 A |

(Continued)

FOREIGN PATENT DOCUMENTS

| | | |
|---|---|---|
| GB | 929039 A | 6/1963 |
| GB | 2250782 A | 6/1992 |
| WO | 2010146288 A1 | 12/2010 |

OTHER PUBLICATIONS

"The Results of Phase I SBIR 'Ceramic Composite Research for Total Joint Arthroplasty' Ceramic Hip Replacements," Ceramic Industry, Dec. 1999, p. 30-33.*

(Continued)

*Primary Examiner* — Phutthiwat Wongwian
*Assistant Examiner* — Michael B Mantyla
(74) *Attorney, Agent, or Firm* — Bachman & LaPointe, P.C.

(57) ABSTRACT

A first member is retained to a second member to resist separation in a first direction. A joint comprises a first recess in the first member. The first member comprises at least a ceramic matrix composite (CMC) substrate. The joint comprises at least one ceramic key partially accommodated in the first recess and engaging the second member. The second member comprises at least a metallic substrate.

23 Claims, 17 Drawing Sheets

(56) References Cited

U.S. PATENT DOCUMENTS

| | | | |
|---|---|---|---|
| 4,904,265 A * | 2/1990 | MacCollum et al. | 623/22.28 |
| 4,986,834 A * | 1/1991 | Smith et al. | 623/23.32 |
| 5,004,476 A * | 4/1991 | Cook | 623/23.3 |
| 5,015,257 A * | 5/1991 | Crowninshield et al. | 623/22.45 |
| 5,037,438 A * | 8/1991 | Davidson | 623/22.15 |
| 5,092,737 A | 3/1992 | Lau | |
| 5,197,989 A * | 3/1993 | Hinckfuss et al. | 623/22.42 |
| 5,284,484 A * | 2/1994 | Hood et al. | 606/99 |
| 5,299,914 A | 4/1994 | Schilling | |
| 5,380,157 A * | 1/1995 | Shaffer | 416/220 R |
| 5,391,404 A * | 2/1995 | Lee et al. | 427/452 |
| 5,392,596 A | 2/1995 | Holsapple et al. | |
| 5,431,541 A * | 7/1995 | Shaffer | 416/215 |
| 5,457,954 A * | 10/1995 | Boyd et al. | 60/800 |
| 5,466,122 A | 11/1995 | Charbonnel et al. | |
| 5,549,700 A * | 8/1996 | Graham et al. | 623/22.14 |
| 5,580,352 A * | 12/1996 | Sekel | 623/22.46 |
| 5,681,872 A * | 10/1997 | Erbe | 523/114 |
| 5,749,721 A * | 5/1998 | Klinge et al. | 431/328 |
| 5,935,171 A * | 8/1999 | Schneider et al. | 623/22.15 |
| 6,042,315 A | 3/2000 | Miller et al. | |
| 6,045,310 A * | 4/2000 | Miller et al. | 411/383 |
| 6,096,084 A * | 8/2000 | Townley | 623/23.12 |
| 6,197,424 B1 | 3/2001 | Morrison et al. | |
| 6,200,092 B1 | 3/2001 | Koschier | |
| 6,241,471 B1 | 6/2001 | Herron | |
| 6,250,883 B1 | 6/2001 | Robinson et al. | |
| 6,325,593 B1 | 12/2001 | Darkins, Jr. et al. | |
| 6,397,603 B1 * | 6/2002 | Edmondson et al. | 60/753 |
| 6,451,416 B1 | 9/2002 | Holowczak et al. | |
| 6,514,046 B1 | 2/2003 | Morrison et al. | |
| 6,648,597 B1 | 11/2003 | Widrig et al. | |
| 6,676,373 B2 | 1/2004 | Marlin et al. | |
| 6,696,144 B2 * | 2/2004 | Holowczak et al. | 428/293.4 |
| 6,709,230 B2 | 3/2004 | Morrison et al. | |
| 6,733,233 B2 | 5/2004 | Jasklowski et al. | |
| 6,746,755 B2 | 6/2004 | Morrison et al. | |
| 6,758,386 B2 | 7/2004 | Marshall et al. | |
| 6,758,653 B2 | 7/2004 | Morrison | |
| 6,808,363 B2 | 10/2004 | Darkins, Jr. et al. | |
| 6,854,738 B2 | 2/2005 | Matsuda et al. | |
| 6,893,214 B2 | 5/2005 | Alford et al. | |
| 6,910,853 B2 | 6/2005 | Corman et al. | |
| 6,935,836 B2 | 8/2005 | Ress, Jr. et al. | |
| 7,000,406 B2 * | 2/2006 | Markarian et al. | 60/796 |
| 7,090,459 B2 | 8/2006 | Bhate et al. | |
| 7,093,359 B2 | 8/2006 | Morrison et al. | |
| 7,094,027 B2 | 8/2006 | Turner et al. | |
| 7,114,917 B2 | 10/2006 | Legg | |
| 7,117,983 B2 | 10/2006 | Good et al. | |
| 7,153,096 B2 | 12/2006 | Thompson et al. | |
| 7,198,454 B2 | 4/2007 | Evans | |
| 7,198,458 B2 | 4/2007 | Thompson | |
| 7,247,003 B2 | 7/2007 | Burke et al. | |
| 7,278,830 B2 | 10/2007 | Vetters | |
| 7,384,240 B2 | 6/2008 | McMillan et al. | |
| 7,434,670 B2 | 10/2008 | Good et al. | |
| 7,435,058 B2 | 10/2008 | Campbell et al. | |
| 7,452,182 B2 | 11/2008 | Vance et al. | |
| 7,452,189 B2 | 11/2008 | Shi et al. | |
| 7,488,157 B2 | 2/2009 | Marini et al. | |
| 7,491,032 B1 | 2/2009 | Powell et al. | |
| 7,497,662 B2 | 3/2009 | Mollmann et al. | |
| 7,510,379 B2 | 3/2009 | Marusko et al. | |
| 7,534,086 B2 | 5/2009 | Mazzola et al. | |
| 7,546,743 B2 | 6/2009 | Bulman et al. | |
| 7,600,970 B2 | 10/2009 | Bhate et al. | |
| 7,647,779 B2 | 1/2010 | Shi et al. | |
| 7,648,336 B2 | 1/2010 | Cairo | |
| 7,665,960 B2 | 2/2010 | Shi et al. | |
| 7,726,936 B2 | 6/2010 | Keller et al. | |
| 7,753,643 B2 | 7/2010 | Gonzalez et al. | |
| 7,762,768 B2 | 7/2010 | Shi et al. | |
| 7,771,160 B2 | 8/2010 | Shi et al. | |
| 7,785,076 B2 | 8/2010 | Morrison et al. | |
| 7,824,152 B2 | 11/2010 | Morrison | |
| 8,181,465 B2 * | 5/2012 | Prociw et al. | 60/796 |
| 2002/0168505 A1 * | 11/2002 | Morrison et al. | 428/293.1 |
| 2005/0158171 A1 | 7/2005 | Carper et al. | |
| 2005/0254942 A1 | 11/2005 | Morrison et al. | |
| 2007/0072007 A1 | 3/2007 | Carper et al. | |
| 2007/0151249 A1 * | 7/2007 | Barbeln et al. | 60/752 |
| 2008/0034759 A1 | 2/2008 | Bulman et al. | |
| 2009/0013695 A1 | 1/2009 | Dierberger et al. | |
| 2009/0169368 A1 * | 7/2009 | Schlichting et al. | 415/173.1 |
| 2009/0191368 A1 * | 7/2009 | Hironaga et al. | 428/34.4 |
| 2009/0226279 A1 * | 9/2009 | Jarmon | 411/340 |
| 2010/0021290 A1 | 1/2010 | Schaff et al. | |
| 2010/0032875 A1 | 2/2010 | Merrill et al. | |
| 2010/0101232 A1 | 4/2010 | Shi et al. | |
| 2010/0111678 A1 | 5/2010 | Habarou et al. | |
| 2010/0226760 A1 | 9/2010 | McCaffrey | |
| 2010/0247953 A1 * | 9/2010 | Bossmann et al. | 428/623 |
| 2010/0257864 A1 | 10/2010 | Prociw et al. | |
| 2011/0027098 A1 | 2/2011 | Noe et al. | |
| 2011/0052384 A1 | 3/2011 | Shi et al. | |

OTHER PUBLICATIONS

Martin Dietrich, Howard Dobbs and Stefan Leyen, "Ceramic Implants for Joint Arthroplasty—Experiences and Visions," CeramTec AG, Buiness Briefing Global Healthcare—Advanced Medical Technologies, 2004.*

Finsbury Orthopaedics. "DeltaMotion Hip System". http://www.finsbury.org. hardcopy brochure—2010, ebrochure—http://www.docstoc.com/docs/74675671/HIP-SYSTEM—posted Mar. 24, 2011.*

Depuy Orthopaedics. "Pinnacle Acetabular Cup System". 2009.*

Nohut, S. "Failure Probablity of Ceramic Coil Springs". Journal of the European Ceramic Society. Hamburg Institute of Technology, Institute of Advanced Ceramics, Sep. 30, 2008.*

"High Tempeature Ceramic Cements". Sauereisen. www.sauereisen.com. 2001.*

Wikipedia—Ceramic Matrix Composites; http://web.archive.org/web/20110521102800/http://en.wikipedia.org/wiki/Ceramic_Matrix_Composite; p. 1, II. 1 -3; May 21, 2011.*

Characterization of First-Stage Silicon Nitride Components After Exposure to an Industrial Gas Turbine H.-T. Lin,*,M. K. Ferber,* and P. F. Becher, J. R. Price, M. van Roode, J. B. Kimmel, and O. D. Jimenez J. Am. Ceram. Soc., 89 [1] 258-265 (2006).

Evaluation of Mechanical Stability of a Commercial Sn88 Silicon Nitride at Intermediate Temperatures Hua-Tay Lin, Mattison K. Ferber,* and Timothy P. Kirkland*, J. Am. Ceram. Soc., 86 [7] 1176-81 (2003).

Research and Development of Ceramic Turbine Wheels, K. Watanab, M. Masuda T. Ozawa, M. Matsui, K. Matsuhiro, 36 I vol. 115, Jan. 1993, Transactions of the ASME.

A.L. Neuburger and G. Carrier, Design and Test of Non-rotating Ceramic Gas Turbine Components, ASME Turbo Expo 1988, ASME paper 88-GT-146.

Vedula, V., Shi, J., Liu, S., and Jarmon, D. "Sector Rig Test of a Ceramic Matrix Composite (CMC) Combustor Liner", GT2006-90341, Proceedings of GT2006, ASME turbo Expo 2006: Power for Land, Sea and Air, Barcelona, Spain, May 8-11, 2006.

Bhatia, T., "Enabling Technologies for Hot Section Components", Contract N00014-06-C-0585, Final Report, Jan. 30, 2009.

Vedula, V., et al., "Ceramic Matrix Composite Turbine Vanes for Gas Turbine Engines", ASME Paper GT2005-68229, Proceedings of ASME Turbo Expo 2005, Reno, Nevada, Jun. 6-9, 2005.

Verrilli, M., Calamino, A., Robinson, R.C., and Thomas, D.J., "Ceramic Matrix Composite Vane Subelement Testing in a Gas Turbine Environment", Proceedings of ASME Turbo Expo 2004, Power for Land, Sea, and Air, Jun. 14-17, 2004, Vienna, ASME Paper GT2004-53970.

Watanbe, K., Suzumura, N., Nakamura, T., Murata, H., Araki, T., and Natsumura, T., "Development of CMC Vane for Gas Turbine Engine", Ceramic Engineering and Science Proceedings, vol. 24, Issue 4, 2003, pp. 599-604.

(56) References Cited

OTHER PUBLICATIONS

Calamino, A. and Verrilli, M., "Ceramic Matrix Composite Vane Subelement Fabrication", Proceedings of ASME Turbo Expo 2004, Power for Land, Sea, and Air, Jun. 14-17, 2004, Vienna, ASME Paper GT2004-53974.

Bhatia, T., et al., "CMC Combustor Line Demonstration in a Small Helicopter Engine", ASME Turbo Expo 2010, Glasgow, UK, Jun. 14-18, 2010.

European Search Report for EP Patent Application No. 12172774.7, dated Nov. 6, 2013.

\* cited by examiner

| Specimen Number | FIGS. | CMC Thickness, T (in) | Sphere Diameter, D (in) | % Below Surface | Sphere Center to End, S₁ | CMC on End, S₂ | Test Angle θ₆ | Relative Max Load | Failure Mode |
|---|---|---|---|---|---|---|---|---|---|
| 08-001 | 18,27 | 0.093 | 0.125 | 46 | 0.151 | 0.089 | 70 | 1.00 | flexural, tensile |
| 08-002 | 19,28 | 0.099 | 0.125 | 48 | 0.103 | 0.041 | 70 | 0.60 | flexural, shear |
| 08-003 | -- | 0.088 | 0.125 | 33 | 0.132 | 0.070 | 70 | 0.92 | flexural, shear |
| 08-004 | -- | 0.092 | 0.094 | 56 | 0.145 | 0.098 | 70 | 0.60 | through-thickness compression, shear |
| 08-005 | 20 | 0.092 | 0.094 | 64 | 0.157 | 0.110 | 45 | 0.71 | shear at divot |
| 08-006 | -- | 0.083 | 0.094 | 66 | 0.110 | 0.063 | 70 | 0.48 | through-thickness compression, shear |
| 08-007 | -- | 0.082 | 0.094 | 65 | 0.155 | 0.108 | 70 | 0.63 | through-thickness compression, shear |
| 08-008 | 21,29 | 0.088 | 0.094 | 50 | 0.164 | 0.117 | 70 | 0.75 | through-thickness compression, shear |
| 08-009 | -- | 0.086 | 0.094 | 59 | 0.115 | 0.068 | 70 | 0.45 | through-thickness compression, shear |
| 08-010 | -- | 0.084 | 0.094 | 47 | 0.162 | 0.115 | 70 | 0.37 | through-thickness compression, shear |
| 08-011 | -- | 0.084 | 0.094 | 46 | 0.107 | 0.060 | 70 | 0.46 | shear at divot |
| 08-012 | 30 | 0.088 | 0.094 | 55 | 0.140 | 0.093 | 70 | 0.53 | shear at divot |
| 08-013 | -- | 0.097 | 0.094 | 56 | 0.144 | 0.097 | 0 | 0.68 | in-plane compression |
| 08-014 | -- | 0.092 | 0.094 | 57 | 0.375 | 0.328 | 0 | 1.00 | flexural, tensile |
| 08-015 | 22,31 | 0.085 | 0.125 | 49 | 0.375 | 0.313 | 0 | 1.16 | in-plane compression |
| 08-016 | -- | 0.085 | 0.125 | 47 | 0.582 | 0.520 | 0 | 1.28 | shear at divot |
| 08-017 | -- | 0.100 | 0.125 | 62 | 0.130 | 0.068 | 0 | 0.71 | flexural, tensile |
| 08-018 | 23,24,32 | 0.095 | 0.125 | 56 | 0.415 | 0.353 | 0 | 1.08 | in-plane compression |
| 08-019 | -- | 0.092 | 0.125 | 50 | 0.625 | 0.563 | 0 | 1.26 | in-plane compression |
| 08-020* | 25,26,33 | 0.091 | 0.125 | 50 | 0.360 | 0.298 | 0 | 1.18 | in-plane compression |

* Post Fatigue Test

*FIG. 15*

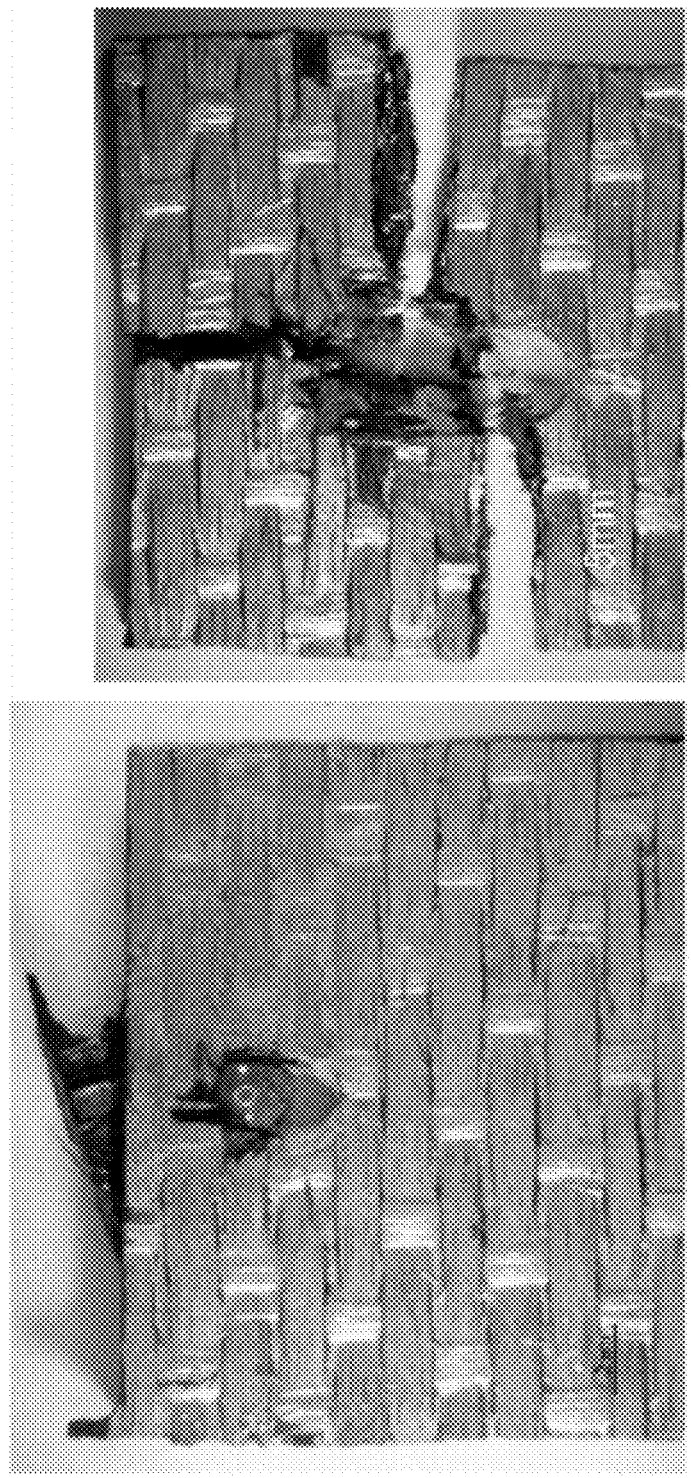

GAS TURBINE ENGINE JOINT HAVING A METALLIC MEMBER, A CMC MEMBER, AND A CERAMIC KEY

BACKGROUND

The disclosure relates to attaching ceramic matrix composite (CMC) materials to metals. More particularly, the disclosure relates to such attachments in gas turbine engines.

Ceramic matrix composite (CMC) materials have been proposed for various uses in high temperature regions of gas turbine engines. US Pregrant Publication 2010/0257864 of Prociw et al. (the disclosure of which is incorporated herein in its entirety as if set forth at length) discloses use in duct portions of an annular reverse flow combustor. The annular reverse flow combustor turns the flow by approximately 180 degrees from an upstream portion of the combustor to the inlet of the turbine section. Viewed in axial/radial section, an inlet dome exists at the upstream end of the combustor. Additionally, an outboard portion of the turn is formed by a large exit duct (LED) and an inboard portion of the turn is formed by a small exit duct (SED). The LED and SED may be formed of CMC. The CMC may be secured to adjacent metallic support structure (e.g., engine case structure). The SED and LED are alternatively referred to via the same acronyms but different names with various combinations of "short" replacing "small", "long" replacing "large", and "entry" replacing "exit" (this last change representing the point of view of the turbine rather than the point of view of the upstream portion of the combustor). An outer air inlet ring is positioned between the LED and the OD of the inlet dome. An inner air inlet ring is positioned between the SED and the ID of the inlet dome.

Robustly and efficiently attaching a CMC to the metal presents engineering challenges.

SUMMARY

One aspect of the disclosure involves retaining a first member to a second member to resist separation in a first direction. A joint comprises a first recess in the first member. The first member comprises at least a ceramic matrix composite (CMC) substrate. The joint comprises at least one ceramic key partially accommodated in the first recess and engaging the second member. The second member comprises at least a metallic substrate.

In various embodiments, the joint may further comprise a second recess in the second member. The at least one ceramic key to be accommodated in the second recess.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 15 is a table of stress test results using the fixtures of FIGS. 12-14.

FIG. 21 is a post-test photograph of specimen 08-008 of FIG. 15.

FIG. 22 is a post-test photograph of specimen 08-015 of FIG. 15.

Like reference numbers and designations in the various drawings indicate like elements.

DETAILED DESCRIPTION

Figure 1:
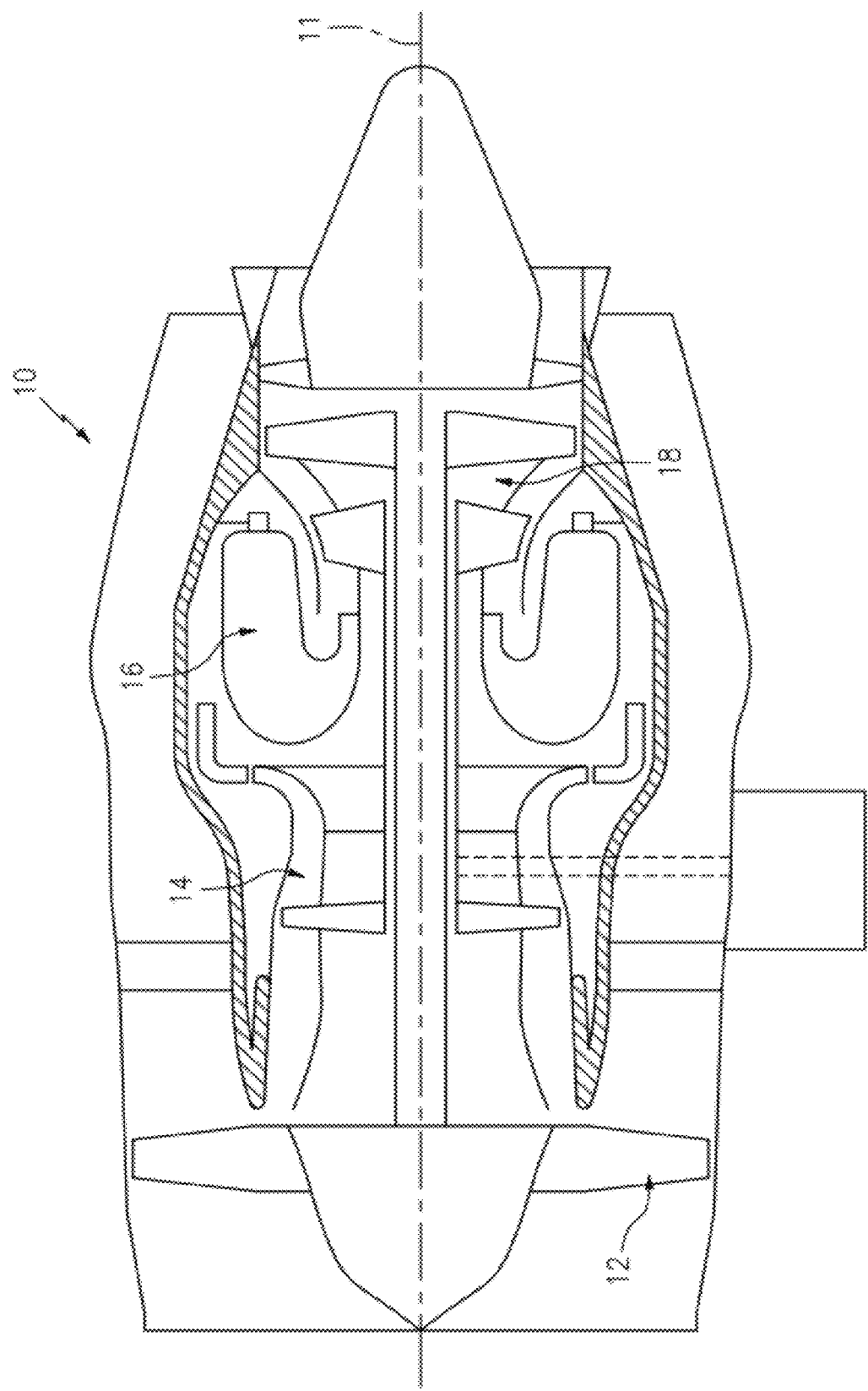
FIG. 1 is a partially schematic axial sectional/cutaway view of a gas turbine engine.

FIG. 1 shows a gas turbine engine 10 generally comprising in serial flow communication from upstream to downstream: a fan 12 through which ambient air is propelled; a multistage compressor 14 for pressurizing the air; an annular reverse flow combustor 16 in which the compressed air is mixed with fuel and ignited for generating an annular stream of hot combustion gases; and a turbine section 18 for extracting energy from the combustion gases.

In general, the terms axial and radial as used herein are intended to be defined relative to the main central longitudinally extending engine axis 11 (centerline). Further, when referring to the combustor 16 herein, the terms upstream and downstream and intended to be defined relative to the general flow of air and hot combustion gases in the combustor, i.e. from a fuel nozzle end of the combustor where fuel and air are injected for ignition to a combustor exit where the combustion gases exit toward the downstream first turbine stage.

Figure 2:
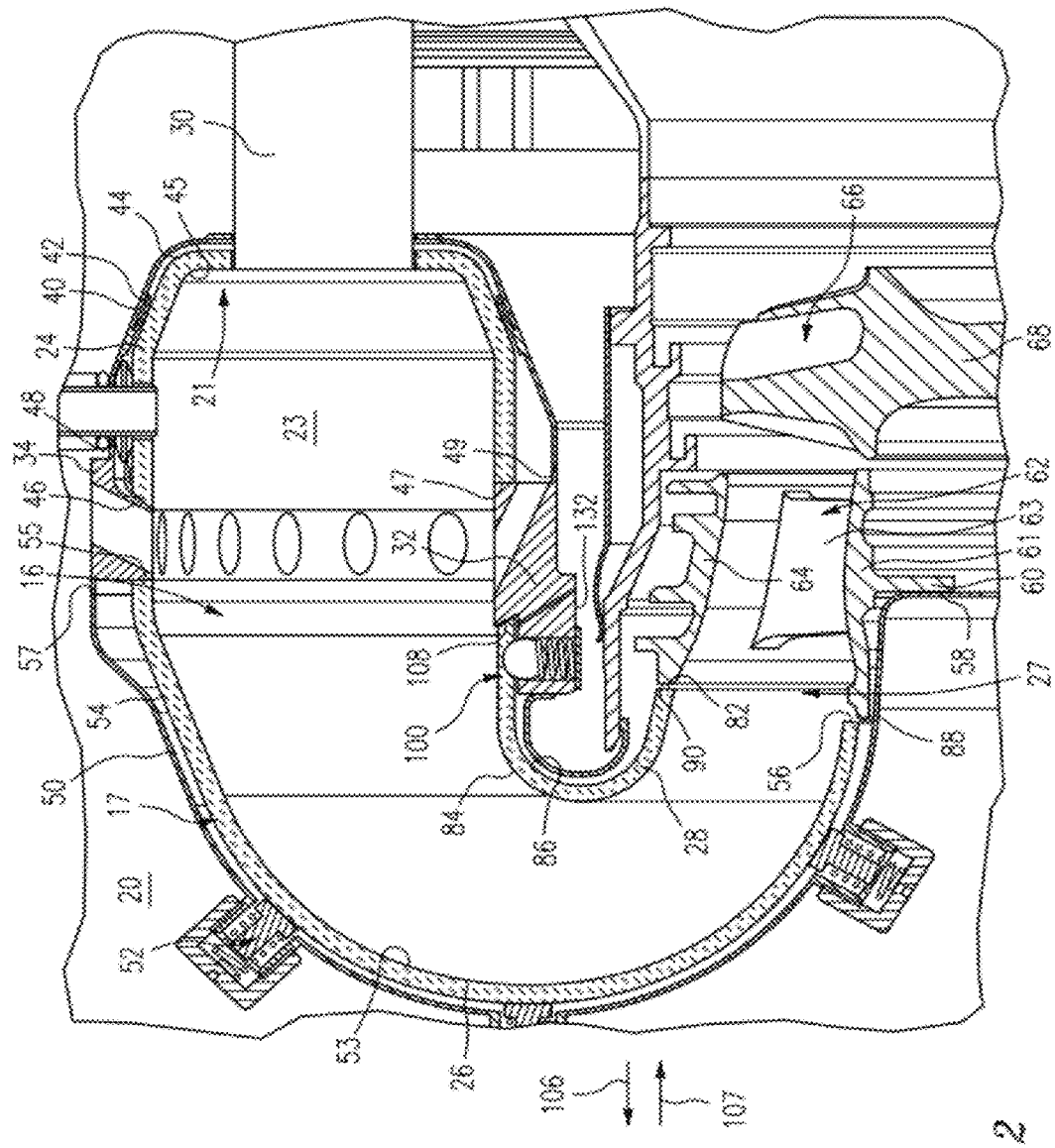
FIG. 2 is an axial/radial sectional view of a combustor of the engine of FIG. 1.

Referring to FIG. 2, the annular reverse flow combustor 16 comprises generally an inner combustor liner 17, directly exposed to and facing the combustion chamber 23 defined therewithin. The inner liner 17 of the combustor 16 is thus exposed to the highest temperatures, being directly exposed to the combustion chamber 23. As such, and as will be described in further detail below, the inner liner 17 is composed of at least one liner portion that is made of a non-metallic high temperature material such as a ceramic matrix composite (CMC) material. Such a CMC liner portion is much better able to withstand high temperatures with little or no cooling in comparison with standard metallic combustor liners. An air plenum 20, which surrounds the combustor 16, receives compressed air from the compressor section 14 of the gas turbine engine 10 (see FIG. 1). This compressed air is fed into the combustion chamber 23, however as will be described further below, exemplary CMC liner portions of the combustor 16 are substantially free of airflow passages (e.g., cooling holes) extending therethrough. This greatly simplifies their production, as no additional machining steps (such as drilling of cooling holes) are required once the CMC liner portions are formed. As such, the compressed air from the plenum 20 is, in at least this embodiment, fed into the combustion chamber 23 via air holes defined in metallic ring portions 32, 34 (e.g., high temperature nickel-based superalloy substrates with thermal barrier coatings) of the combustor liner, as will be described further below. Metered air flow can also be fed into the combustion chamber via the fuel nozzles 30.

The inner liner 17 extends from an upstream end 21 of the combustor 16 (where a plurality of fuel nozzles 30, which communicate with the combustion chamber 23 to inject fuel therein, are located) to a downstream end (relative to gas flow in the combustion chamber) defining the combustor exit 27. The inner liner 17 is, in at least one embodiment, comprised of three main liner portions, namely a dome portion (inlet dome) 24 at the upstream end (inlet end) 21 of the combustor, and a long exit duct portion 26 and a short exit duct portion 28 which together form the combustor exit 27 at their respective downstream ends. Each of the dome portion 24, long exit duct portion 26 and short exit duct portion 28, that are made of the CMC material and which make up a substantial part of the inner liner 17, have a substantially hemi-toroidal shape and constitute an independently formed shell.

FIG. 2 shows a rich burn and quick quench combustor where the three CMC components 24, 26, 28 form the inner liner of combustor. The disclosure is primarily concerned with the attachment of CMC SED 28.

Although ceramic materials have excellent high temperature strength, their coefficients of thermal expansion (CTE) are much lower than those of metals such as the rings 32 and 34. Thermal stress arising from the mismatch of CTEs pose a challenge to the insertion of CMC combustor liner components into gas turbine engines. Exemplary joints thus allow relative movement between the CMC and its metal support structure(s), without introducing damaging thermal stresses.

The nature of the dome 24 and the LED 26 make them relatively easy to compliantly mount. In axial/radial section their exterior surfaces (away from the hot gas of the combustor interior) are generally convex. It is thus easy to compliantly compressively hold them in place. For example, the exemplary dome and LED are contained within respective shells 40 and 50 with compliant mounting members 42 and 52 respectively engaging the exterior surfaces 44 and 54 of the dome and SED. The exemplary shells 40 and 50 are metallic shells mounted to adjacent structure. The exemplary spring members 42 are half leaf spring tabs secured to the interior surface of the shell 40. The exemplary spring members 52 are more complex assemblies of pistons and coil springs with piston heads engaging the LED exterior surface 54.

The exemplary dome further includes an interior surface 45, an outboard rim 46, and an inboard rim 47. The exemplary liner section 40 also includes an outboard rim 48 and an inboard rim 49. The exemplary outboard rim 48 is secured to a mating surface of the outer air inlet ring (outer ring) 34 (e.g., via welding) and the exemplary inboard rim 49 is secured to the inner air inlet ring (inner ring) 32 such as via welding.

Similarly, the LED has an upstream rim 55 and a downstream rim 56. The liner 50 includes an upstream portion (e.g., a rim) 57 and a downstream portion (e.g., a flange) 58. The exemplary rim 57 is secured to the outer ring 34 (e.g., via welding). The exemplary flange 58 is secured to a corresponding flange 60 of the platform ring (inner ring) 61 of an exit vane ring 62. The exemplary exit vane ring 62 includes a circumferential array of airfoils 63 extending from the platform 61 to a shroud ring (outer ring) 64.

The SED extends from an upstream rim 80 (FIG. 3) to a downstream rim 82 and has a generally convex interior surface 84 and a generally concave exterior surface 86. The LED downstream rim 56 and SED downstream rim 82 are proximate respective upstream rims 88 and 90 of the vane inner ring 61 and outer ring 64. The first blade stage of the first turbine section is downstream of the vane ring 62 with the blade airfoils 66 shown extending radially outward from a disk 68.

For mounting of the SED, a leading/upstream portion/region 100 (FIG. 4) of the SED is shown having a circumferential array of recesses 102 in the exterior surface 86. The exemplary SED is of generally constant thickness T (e.g., subject to variations in local thickness associated with the imposed curvature of the cross-section of the SED in the vicinity of up to 20%). Each recess 102 may receive and be engaged by an associated mounting feature 104 (a non-metallic key, more particularly a ceramic key such as a sphere discussed further below) to resist axial separation in a first axial direction 106 (forward in the exemplary engine wherein combustor inlet flow is generally forward). Movement in a second direction 107 opposite 106 is, in the FIG. 3 example also resisted by the cooperation of keys and recesses but also may be resisted by engagement of the rim 80 with a corresponding angled downstream surface 108 of the ring 32 (e.g., at an angle $\theta_1$ off-radial oriented to resist flaring of the portion 100). Exemplary $\theta_1$ are 20-60°, more narrowly, 30-50° or 35-45°). The SED may be retained against outward radial movement/displacement by engagement of the surface portion 102 with the downstream surface 108 and/or by hoop stress in the CMC. For example, alternative implementations may lack the surface 108 and thus rely entirely upon hoop stress to retain the SED against outward radial movement.

An exemplary SED is formed of CMCs such as silicon carbide reinforced silicon carbide (SiC/SiC) or silicon (Si) melt infiltrated SiC/SiC (MI SiC/SiC). The CMC may be a substrate atop which there are one or more protective coating layers or adhered/secured to which there are additional structures. The CMC may be formed with a sock weave fiber reinforcement including continuous hoop fibers. Such fibers become loaded in tension via outward radial force/pressure from the keys 104 responsive to the axial separation force. The recesses (e.g., hemispherical) may be machined after the SED is otherwise fully formed. Exemplary machining of the recesses is via a ball mill impregnated with diamond particles. The recess depth may be chosen to be slightly less than the radius of a spherical key or the radius of curvature of a similar key (e.g., 70-100% of the radius, more narrowly, 80-95%). The recess radius of curvature may closely match that of the sphere (e.g., 100-105% of the sphere radius of curvature, more narrowly, 100-102%).

The exemplary keys 104 have doubly convex surface portions 110 complementary to and positioned to contact the surface of the associated recess 102. In the illustrated embodiment of FIG. 4, the keys are spheres of a monolithic ceramic. The exemplary spheres are spring-loaded to be biased into engagement with the recesses. In the exemplary embodiment, each sphere is partially accommodated in a compartment or recess (e.g., a bore) 120 open to an annular outboard surface 122 of the ring 32 from which the surface 108 extends radially outward. At the opening to the surface 122, the ring 32 includes a slight lip 124 projecting into the bore so that the opening is slightly less than the diameter of the sphere 104 (thereby retaining the ball and preventing the protrusion of the sphere by an amount more than slightly less than a diameter of the sphere). The bore 120 accommodates a spring 126 biasing the key 104 radially outward (e.g., a compression coil spring). An inboard opening of the bore 120 is partially closed by an apertured disk or plate 130 (e.g., welded to a radially inboard surface 132 of the ring 32). In a manufacture sequence, the surfaces 108 and 122 may be formed in an initial machining of the ring 32. The bores may be drilled (e.g., via a bore/counterbore process leaving the lip 124). The key may be inserted from the bore opening along the surface 132 followed by the spring. The disk 130 may be applied, compressing the spring, and then welded in place.

To install the SED, the SED may be installed via translation in the direction 107. An inboard corner junction 140 of the rim 80 and SED exterior surface 86 contacts the key and, via a camming action depresses it radially inward. The key passes along the exterior surface 86 until it snaps into the recess 102. During the passing, friction between the SED exterior surface and the key may cause the exemplary key to roll/rotate. However, alternative keys may maintain their orientation so that the SED merely slides over them. The combination of the key within the recess then resists axial extraction in the direction 106 and further insertion. In various implementations, a ceramic adhesive may be used to secure the key to the recess. The adhesive also serves as a space filling/load transferring member when there is mismatch between the radius of curvature of the recess and that of the key. The surface of the adhesive forms a recess whose curvature may exactly match that of the key when the recess in the CMC alone does not. In some implementations, this may be done prior to installation of the SED (e.g., see FIGS. 10 and 11 discussed below). In other implementations, the adhesive may be applied to the SED and the SED then snaps into engagement. The adhesive may harden when heated in use or in a separate heating step. An exemplary ceramic adhesive is CERABOND™ 865 available from Aremco Products Inc., Valley Cottage, N.Y.

Figure 3:
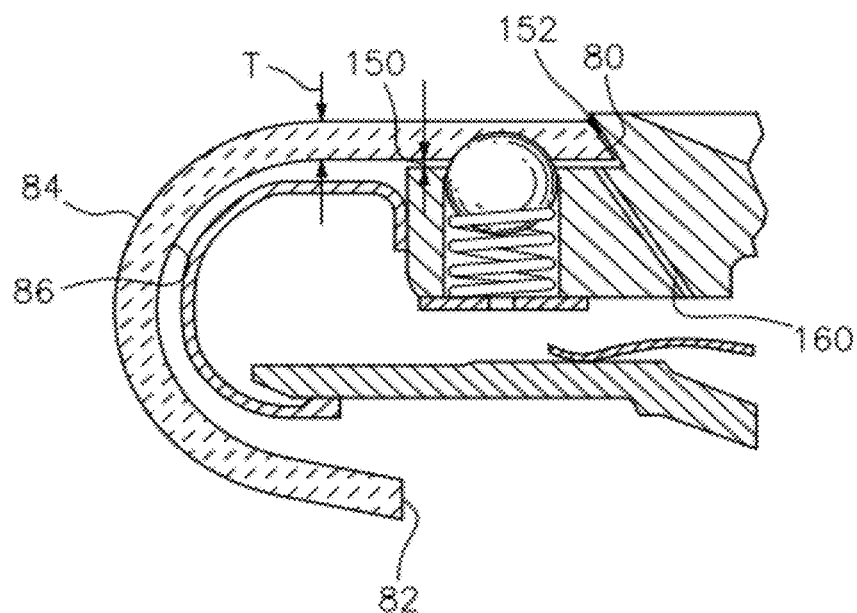
FIG. 3 is an enlarged view of an SED attachment of the combustor of FIG. 2.
Figure 4:
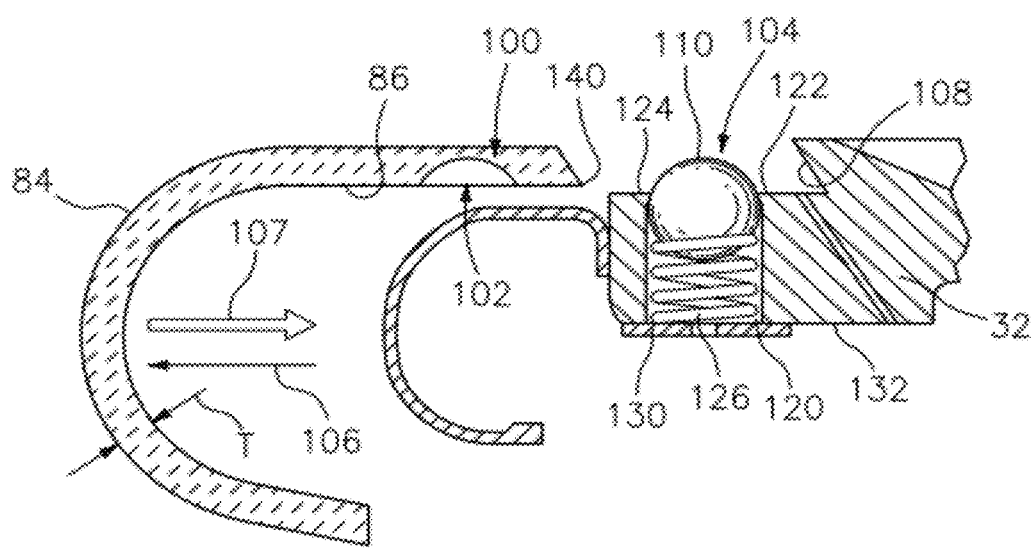
FIG. 4 is a partially assembled view of the attachment of FIG. 3.

Exemplary keys are $Si_3N_4$ or SiC monolithic spheres. They may be made by conventional molding and firing processes for ceramics and, optionally, machined/ground for dimensional precision. An exemplary number of keys is at least four, more particularly, at least eight or an exemplary 10-50. The exemplary SED, keys, and ring 132 are dimensioned so that the keys normally hold the SED out of contact with the ring 32 or other metallic elements. For example, FIG. 3 shows: a radial gap 150 spanned by the keys between the SED exterior surface 86 and the surface 122; and a gap 152 between the SED upstream rim 80 and the surface 108. Nevertheless, in some embodiments/implementations in at least some portion of an operating regime, these gaps may fully close. In other implementations, they may remain gaps throughout the entire operating regime. Maintaining a gap may be particularly relevant if chemical reaction between the CMC and metal is a problem to be avoided.

The aperture in the disk 130 allows cooling air to enter the bore to cool the spring. The cooling air may then pass through the gap 150. An additional passageway 160 provides additional cooling air proximate the upstream rim 80 of the SED.

Figure 5:
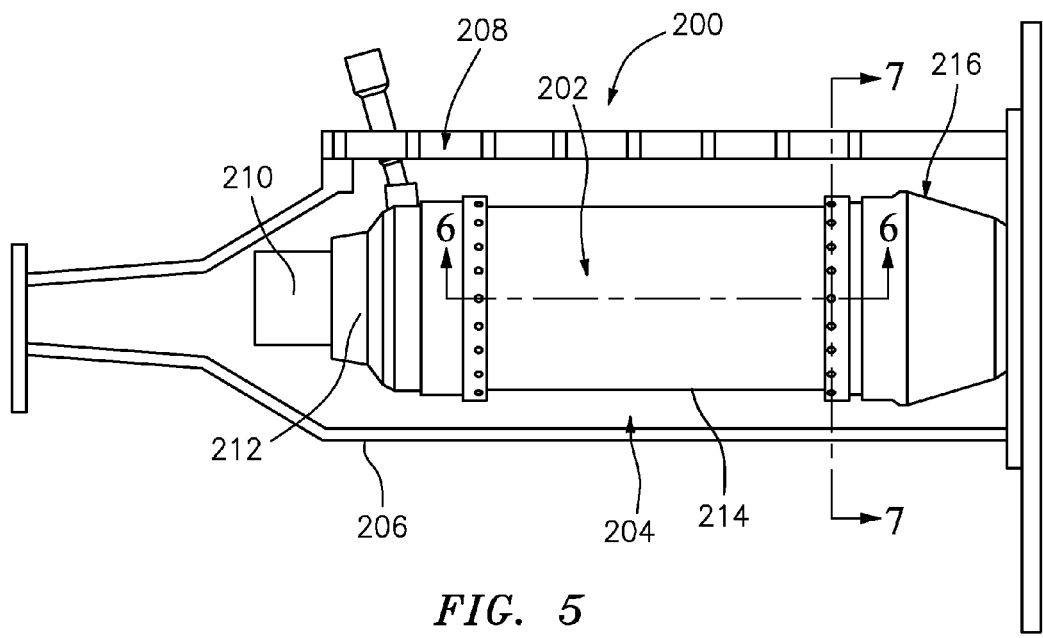
FIG. 5 is a cutaway axial view of a can combustor of an axial flow gas turbine engine.

FIG. 5 shows an alternate combustor 200 being an axial flow can-type combustor system 200. Each combustor may have its own central axis defining axial and radial directions in addition to the overall engine axial and radial directions discussed above. An annular array of individual combustors 202 are located within an annular chamber 204 having an inboard wall 206 and an outboard wall 208. Each individual combustor 202 comprises a multi-piece assembly. In the exemplary embodiment, the assembly comprises an upstream nozzle 210, a multi-piece dome structure 212 downstream thereof, a non-metallic main body 214 (e.g., a CMC) downstream thereof and a multi-piece metallic outlet structure 216 downstream of the CMC main body 214. The CMC main body 214 may be joined to the adjacent metallic structures via joints similar to those described above.

Figure 6:
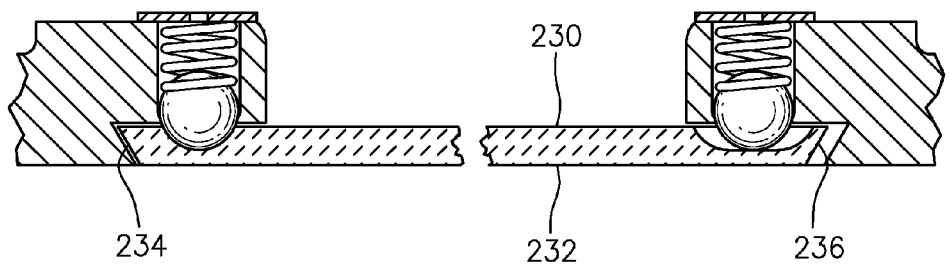
FIG. 6 is a partial axial sectional view of the combustor of FIG. 5, taken along line 6-6.
Figure 7:
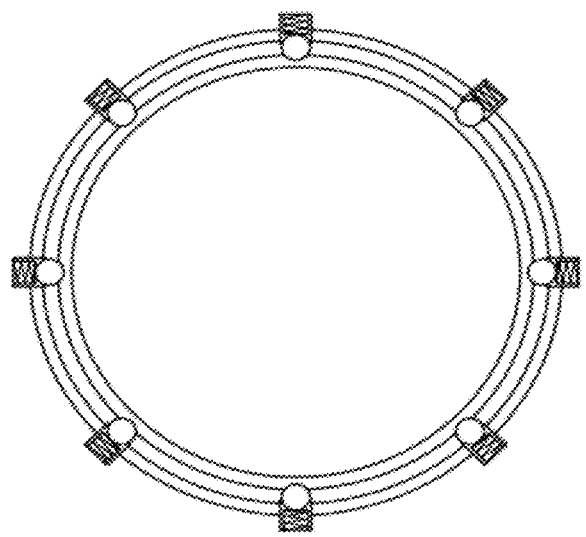
FIG. 7 is a partial transverse sectional view of the combustor of FIG. 5, taken along line 7-7.

Depending on implementation, such joints may be along the exterior surface or the interior surface. Whereas the exterior surface along the SED portion 100 is transversely concave, the exterior surface adjacent at rim portions of the main body 214 is transversely convex. FIG. 6 shows the CMC main body 214 as having an exterior surface 230 and an interior surface 232 and an upstream rim 234 and a downstream rim 236. The respective upstream and downstream rims are angled off-radial and in opposite direction to the SED rim discussed above. The exemplary recesses are formed in the exterior surface 230 and may be engaged via a similar key system to that described above. FIG. 7 shows an exemplary ring of eight keys at each of the respective upstream and downstream ends of the CMC main body 214. In the exemplary implementation, the recesses proximate the upstream rim are similar to those described above. Proximate the downstream rims, however, the recesses are longitudinally elongate channels (e.g., having a transverse semicircular cross-section complementary to that of the keys). This allows relative longitudinal movement between the CMC main body 214 and the downstream keys. This longitudinal movement may be appropriate to address differential thermal expansion of the main body relative to metal structures. During differential thermal expansion, the downstream keys slide along the channels/recesses. In yet an alternative embodiment, the keys may simply engage a non-recessed OD surface of the main body 214.

Figure 8:
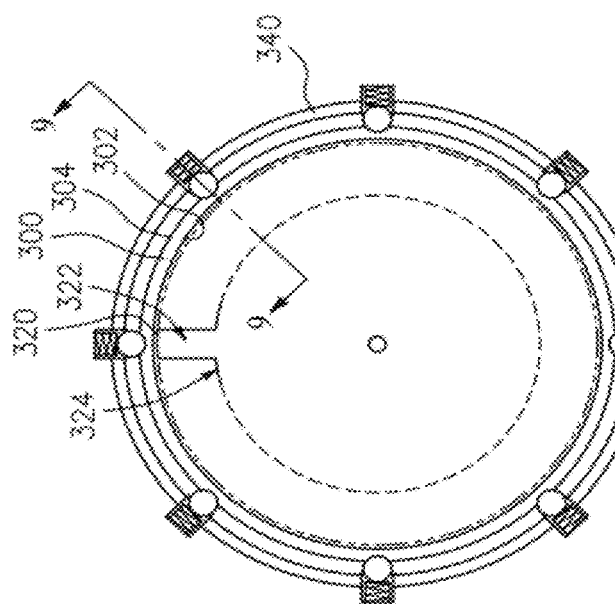
FIG. 8 is a partial transverse sectional view of a blade outer air seal (BOAS).
Figure 9:
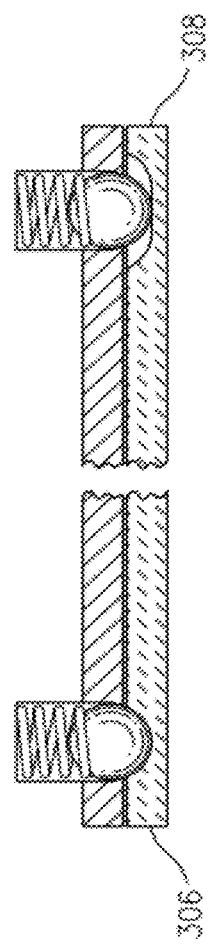
FIG. 9 is an axial sectional view of the BOAS of FIG. 8, taken along line 9-9.

A similar engagement on the exterior circumferential surface of a non-metallic body may be used to mount a blade outer air seal ring. FIG. 8 shows a blade outer air seal (BOAS) ring 300 having an inboard/interior surface 302 and an exterior surface 304. The BOAS ring extends from an upstream end/rim 306 (FIG. 9) to a downstream end/rim 308. The inboard surface 302 may closely face tips 320 of blades 322 on a disk 324 rotating about the engine centerline. Recess/key systems similar to those described above may retain the BOAS ring 300 relative to an engine case structure 340.

Figure 10:
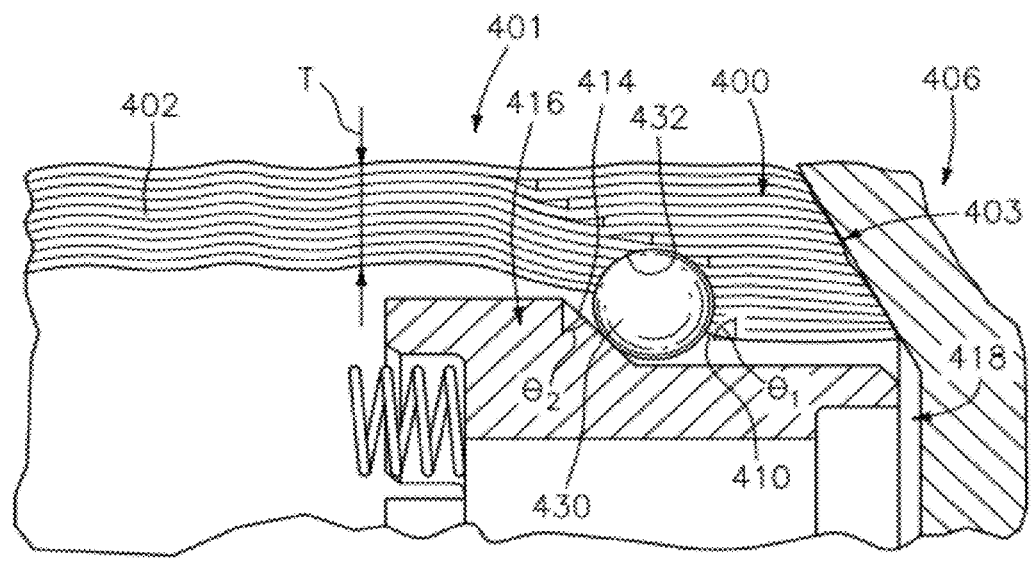
FIG. 10 is a partial axial sectional view of a second SED attachment.

FIG. 10 shows an alternative configuration wherein a leading portion 400 of the SED 401 is relatively thickened compared with a remaining portion 402 (e.g., along the portion 400 the thickness T is at least 150%, more narrowly, 150-250% or 175-225% the thickness T along the portion 402). The leading portion extends generally axially to a leading/upstream rim 403. At a junction between the thickened portion 400 and the remainder, a portion 410 of the exterior surface transitions and thus is directed partially radially inward and partially in the direction 106 (e.g., at an angle $\theta_1$ off radial).

This surface portion 410 is opposed by a corresponding surface portion 414 of a spring-loaded slide ring 416. The slide ring extends from an upstream rim/end 418 which faces the inner ring 406. The surface portion 414 faces partially radially outward and partially opposite the direction 106 (e.g., at an angle off radial of $\theta_1$).

The exemplary second portion 400 is achieved via interleaving additional plies of CMC material with those extending continuously into the remaining portion 402. Ideally, $\theta_1$ and $\theta_2$ may be the same or close thereto and their associated surfaces may be relatively steep/radial. For example, desired $\theta_1$ and $\theta_2$ may be slightly less than 45°. If the surfaces become too shallow/axial, a camming action between the two may radially flare the CMC and allow it to snap out of engagement/retention. However, it may be difficult to achieve such an angle $\theta_1$ of the surface portion 410 either generally or with desired consistency/precision. Accordingly, keying members may be provided to intervene between the ring 416 and the thickened portion of the CMC.

Figure 11:
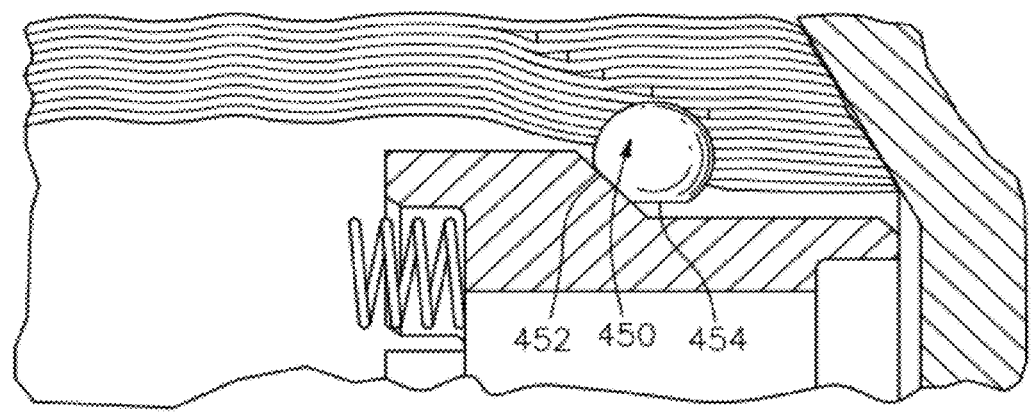
FIG. 11 is a partial axial sectional view of a third SED attachment.

FIG. 10 shows exemplary keys 430 as spheres accommodated in recesses 432 in the surface portion 410. The spheres and recesses may be similarly formed to those described above. For yet further precision, FIG. 11 shows keys 450 having machined facets 452 and 454. The exemplary machined facet 452 is machined after installation of the key to the ceramic and is machined to be parallel with the surface 414. Such machining of the circumferential array of keys provides axial registry of the facets 452 with each other and the surface 414 for even force distribution. The machining of the surface 454 may merely facilitate clearance and installation.

Figure 12:
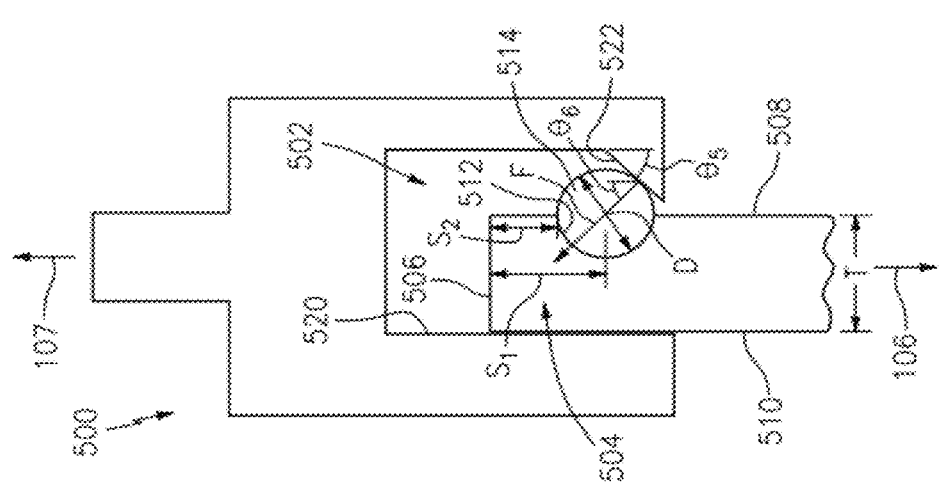
FIG. 12 is a schematic sectional view of a test fixture.

FIG. 12 shows an exemplary test fixture for tensile failure tests of exemplary joints. The fixture comprises a channel 502 which receives an end portion 504 of a CMC sample adjacent an edge/end 506 thereof. The sample has a first face 508 and an opposite second face 510 with a thickness T therebetween. A recess 512 within the first face receives a key (sphere) 514 having a diameter D. FIG. 12 further shows a distance $S_1$ from the center of the sphere to the edge/end 306. With a recess depth of half of D, this leaves a length $S_2$ of intact CMC along the surface 508 to the edge/end 506. In this example, $S_2$ would be $S_1$ minus half of D.

The fixture includes a first wall 520 of the channel along the second face 510. A second wall of the channel includes a camming surface 522 at an angle $\theta_5$ off axial and positioned to engage the key when tension is applied in the direction 106. With a spherical key, the angle of the surface 522 dictates the direction of transmission of a force F from the surface 522 through the key to the sample. The ejector of F is at an angle $\theta_6$ off parallel to the surfaces 508 and 510 and the direction 107 (when the sample is pulled in the direction 106 and the fixture is pulled in the direction 107).

Figure 13:
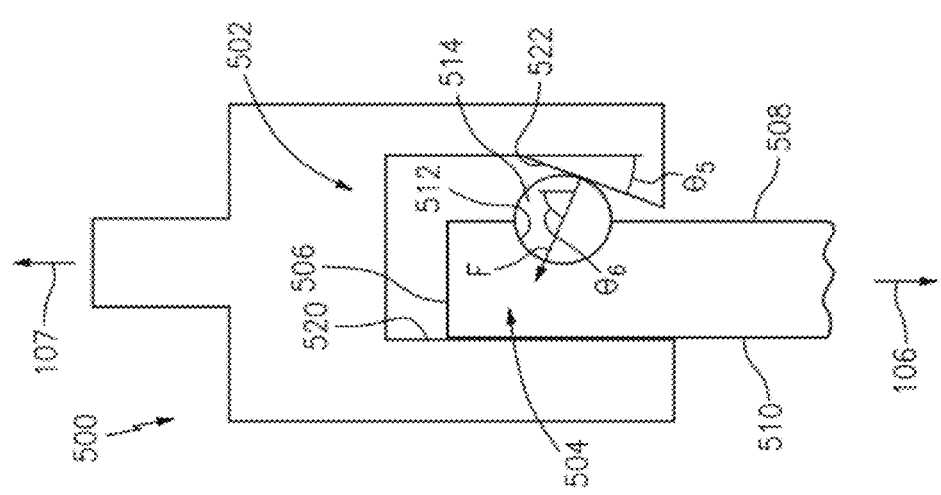
FIG. 13 is a schematic sectional view of a second test fixture.

FIG. 13 shows a similar fixture with a 70° camming surface relative to the CMC plies which are in the X-Y plane of the figure. FIG. 12 further shows a separation S between the center of the key and the end 506.

Figure 14:
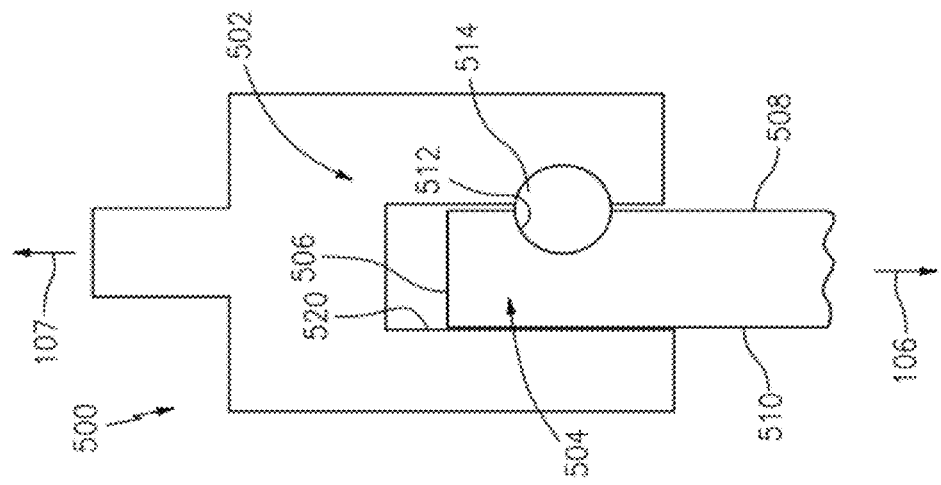
FIG. 14 is a schematic sectional view of a third test fixture.

FIG. 14 shows a similar fixture with an approximately hemispherical recess receiving the portion of the key protruding from the face 508. This effectively provides a zero degree load angle relative to the CMC plies ($\theta_6$ is effectively zero).

Figure 16:
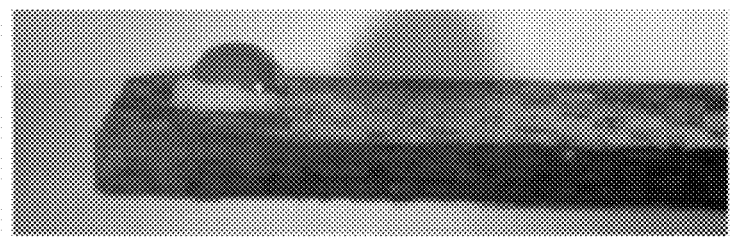
FIG. 16 is a first photograph of a CMC test specimen for use in the fixtures of FIGS. 12-14.
Figure 17:
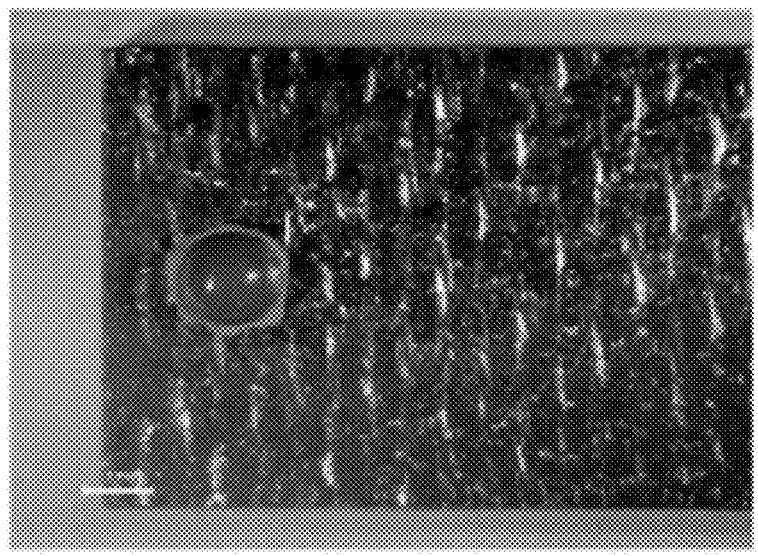
FIG. 17 is a second photograph of the specimen of FIG. 16.
Figure 20:
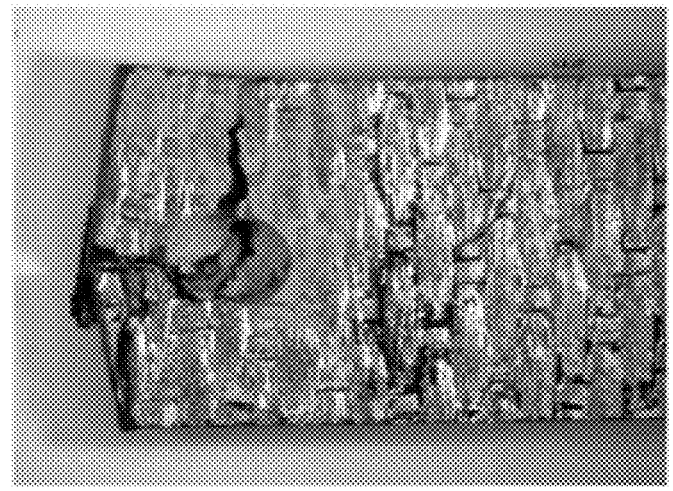
FIG. 20 is a post-test photograph of specimen 08-005 of FIG. 15.
Figure 19:
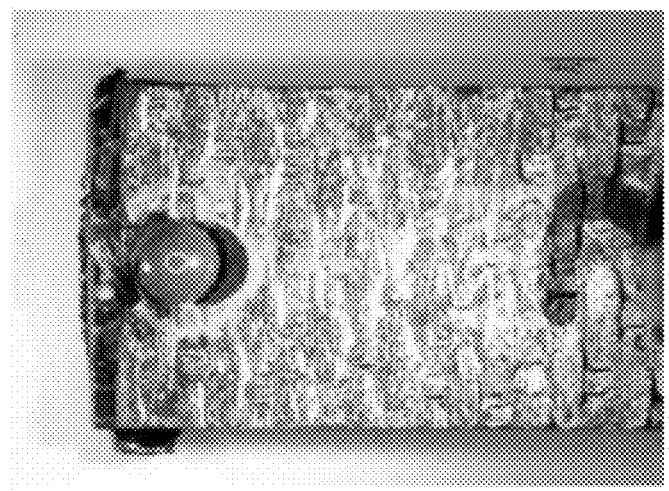
FIG. 19 is a post-test photograph of specimen 08-002 of FIG. 15.
Figure 18:
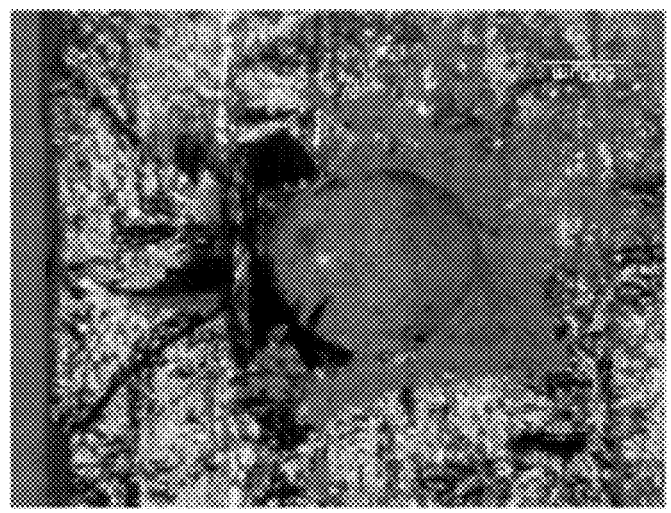
FIG. 18 is a post-test photograph of specimen 08-001 of FIG. 15.
Figure 24:
FIG. 24 is a second post-test photograph of specimen 08-018 with key removed.
Figure 23:
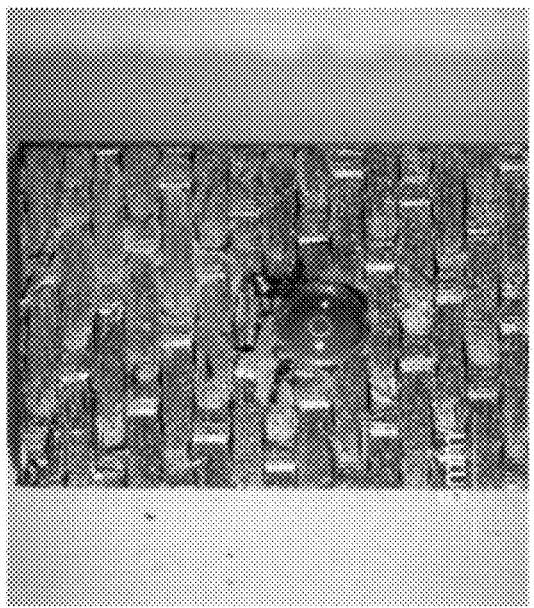
FIG. 23 is a first post-test photograph of specimen 08-018 of FIG. 15.
Figure 26:
FIG. 26 is a post-test photograph of specimen 08-020 with key removed.
Figure 25:
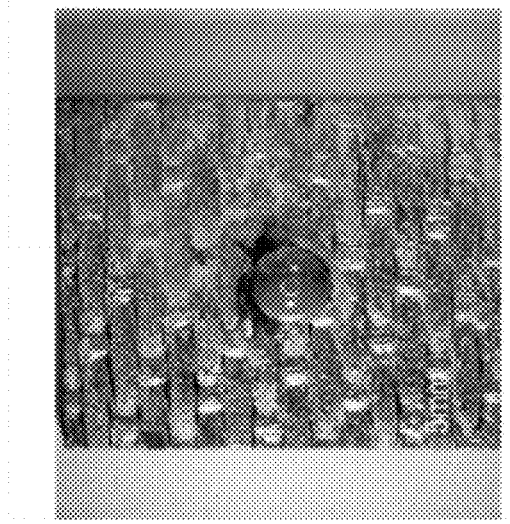
FIG. 25 is a post-test photograph of specimen 08-020 of FIG. 15.
Figure 27:
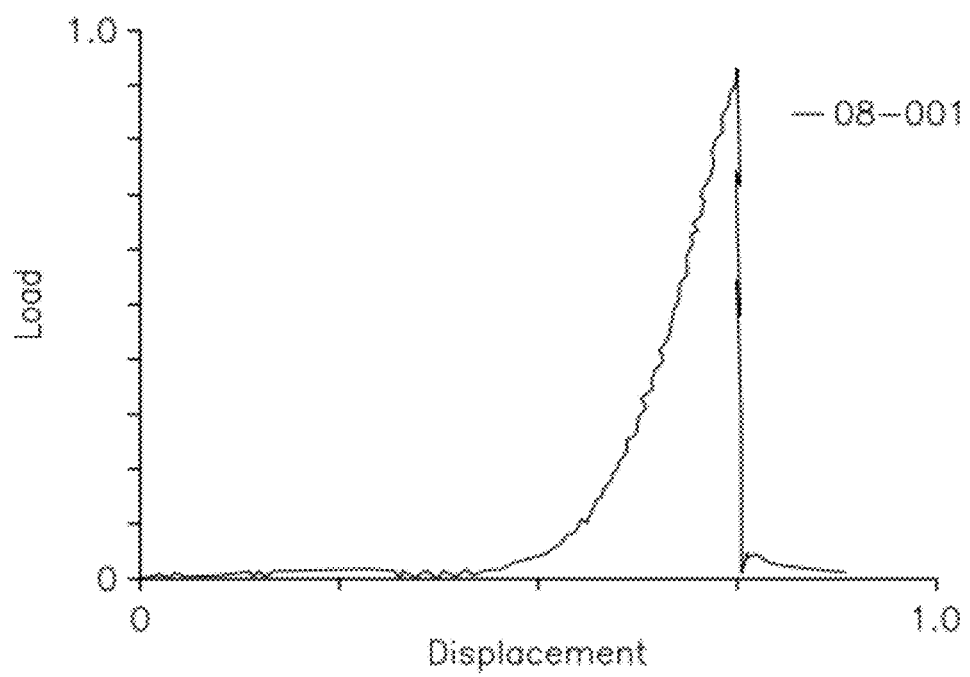
FIG. 27 is a load versus displacement diagram for the test of specimen 08-001 of FIG. 15.
Figure 28:
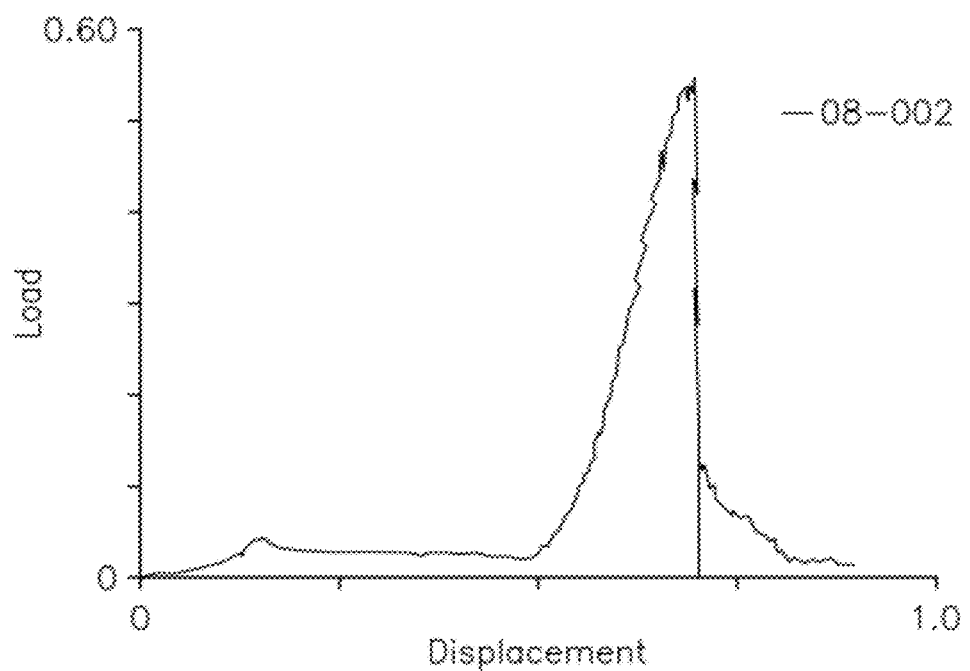
FIG. 28 is a load versus displacement diagram for the test of specimen 08-002 of FIG. 15.
Figure 29:
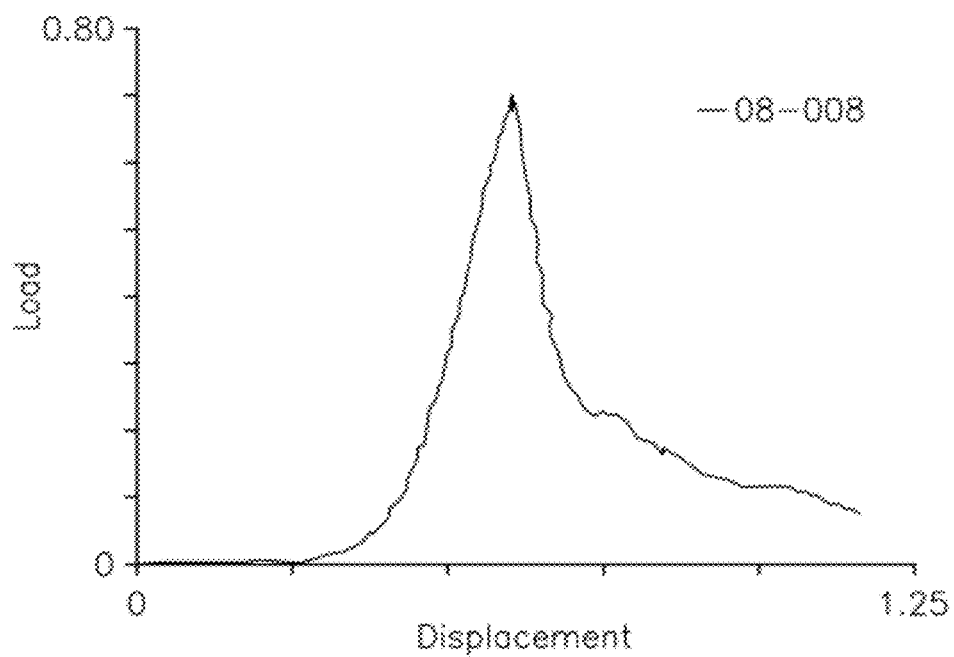
FIG. 29 is a load versus displacement diagram for the test of specimen 08-008 of FIG. 15.
Figure 30:
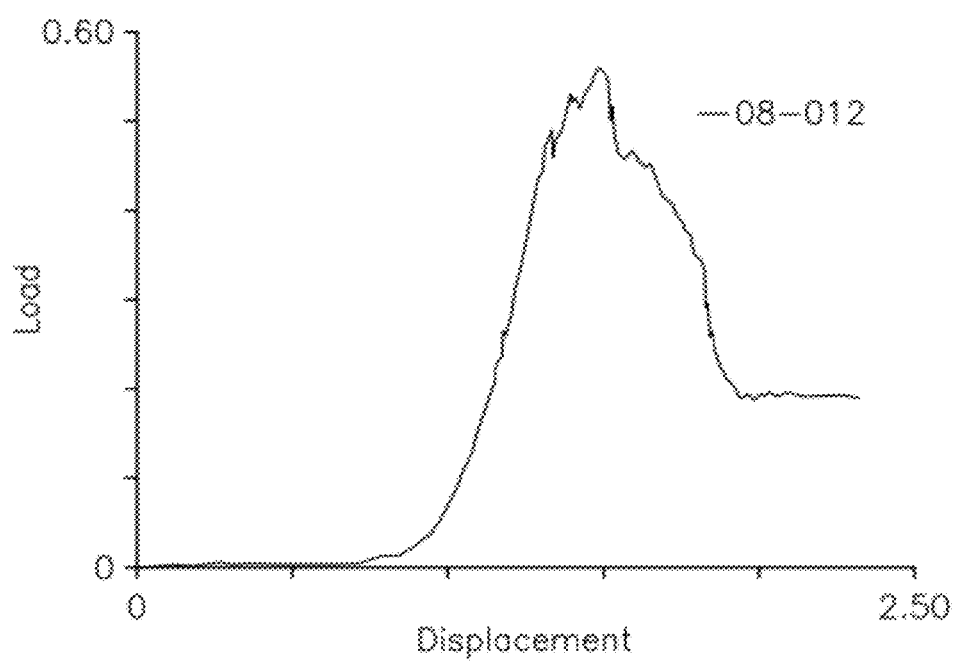
FIG. 30 is a load versus displacement diagram for the test of specimen 08-012 of FIG. 15.
Figure 31:
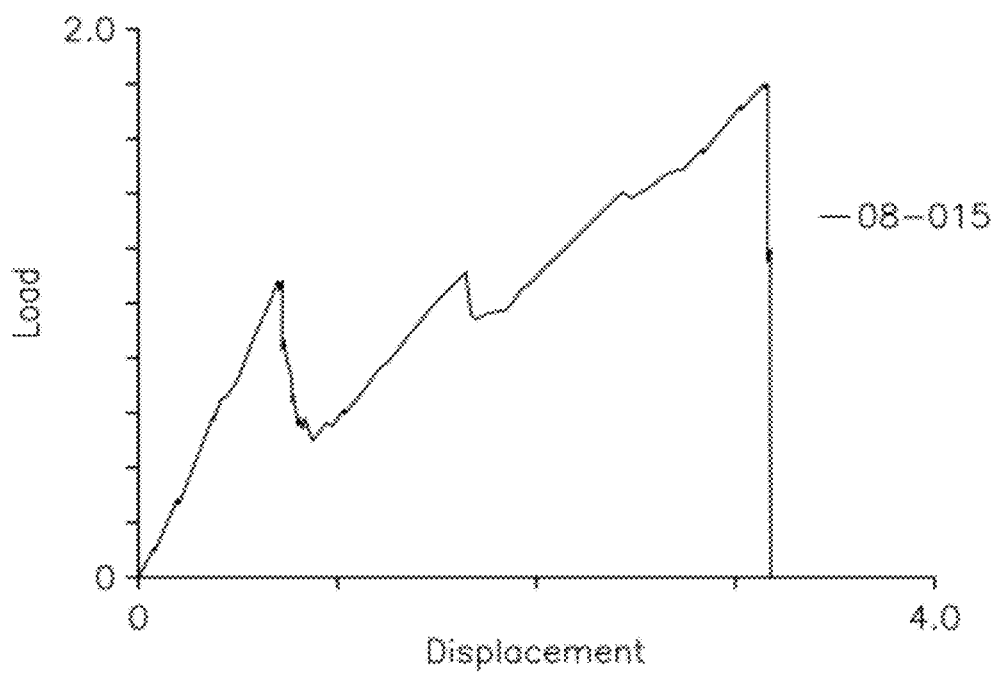
FIG. 31 is a load versus displacement diagram for the test of specimen 08-015 of FIG. 15.
Figure 32:
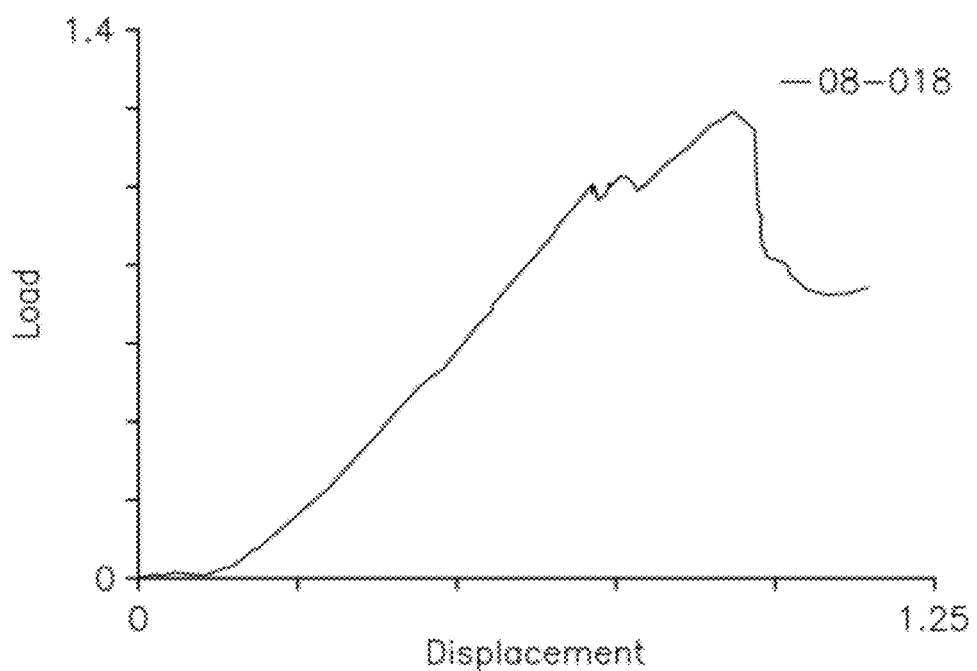
FIG. 32 is a load versus displacement diagram for the test of specimen 08-018 of FIG. 15.
Figure 33:
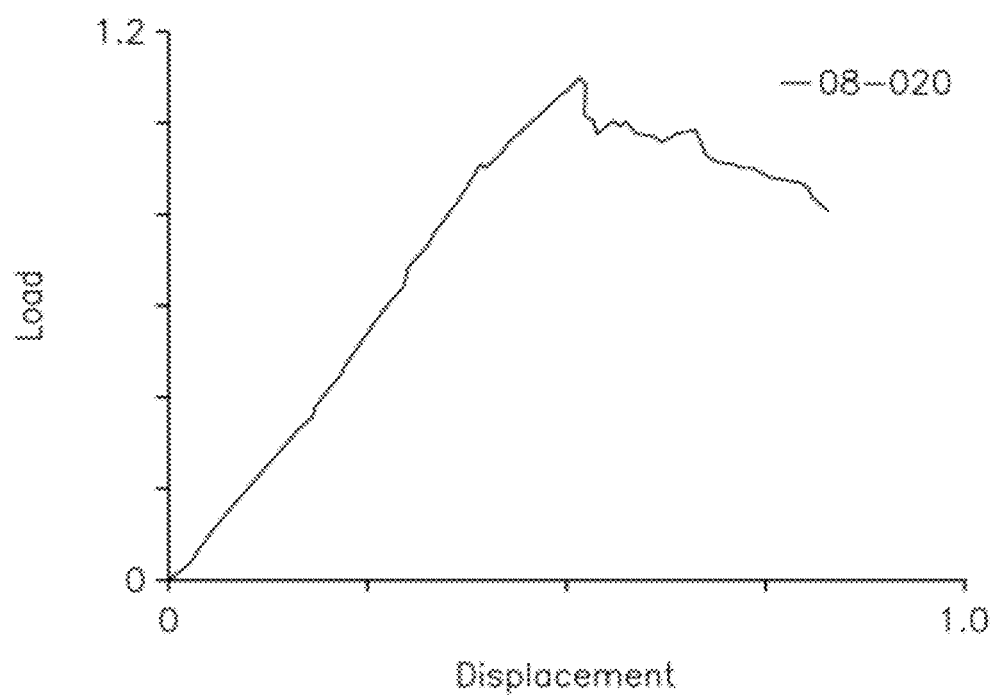
FIG. 33 is a load versus displacement diagram for the test of specimen 08-020 of FIG. 15.

Table I of FIG. 15 shows normalized tensile test results. Specimen 08-020 reflected a post-fatigue test after a 2000 cycle, 2 Hz test with the load cycling from ten pounds to fifty pounds. FIGS. 16 and 17 show a key secured in a recess in a CMC test coupon (as used in the tests of FIG. 15). The securing is via a ceramic adhesive.

FIGS. 18-26 show various of the FIG. 15 specimens post failure. FIGS. 27-33 are normalized load versus normalized displacement diagrams for various of the FIG. 15 specimens.

One or more embodiments have been described. Nevertheless, it will be understood that various modifications may be made. For example, when implemented in the remanufacture of the baseline engine or the reengineering of a baseline engine configuration, details of the baseline configuration may influence details of any particular implementation. Accordingly, other embodiments are within the scope of the following claims.

What is claimed is:

1. A joint retaining a first member to a second member to resist separation in a first direction, the joint comprising:
   a first recess in the first member, the first member comprising at least a fiber-reinforced ceramic matrix composite (CMC) substrate; and
   at least one ceramic key partially accommodated in the first recess and engaging the second member to resist said separation, the second member comprising at least a metallic substrate, wherein:
   the first member is a small exit duct (SED) of a reverse flow combustor and the joint is proximate a leading edge of the SED;
   the first member and the second member encircle an axis;
   there are a circumferential array of said first recesses;
   there are a circumferential array of said ceramic keys, each partially accommodated in a respective associated said first recess;
   said ceramic keys radially position the second member relative to the first member; and
   said ceramic keys are spring biased into engagement with the associated recesses.

2. The joint of claim 1 wherein:
   a circumferential array of second recesses in the second member; and
   each of said ceramic keys is partially accommodated in a respective associated said second recess.

3. The joint of claim 2 further comprising:
   a spring in each second recess providing said spring bias biasing the associated key into the associated first recess.

4. The joint of claim 3, wherein:
   the joint is annular; and
   each spring radially biases the associated key.

5. The joint of claim 1 wherein:
   the first member locally encircles the second member at the joint.

6. The joint of claim 5 wherein:
   the first member is radially retained to the second member at the joint only via hoop stress of the first member.

7. The joint of claim 1 wherein:
   the keys hold the second member spaced-apart from the first member.

8. The joint of claim 1 wherein:
   the first member consists of the CMC substrate; and
   the second member consists essentially of a nickel-based superalloy.

9. The joint of claim 1 wherein:
the first member comprises a coating on the CMC substrate; and
the first recess is within the coating, but not the substrate.

10. The joint of claim 1 wherein:
the key comprises silicon nitride or silicon carbide.

11. The joint of claim 1 wherein:
each key comprises a spherical surface portion in the associated first recess.

12. A method for manufacturing the joint of claim 1, the method comprising:
forming the first recesses by abrasive ball milling.

13. The method of claim 12 further comprising:
securing the keys via a ceramic adhesive.

14. The joint of claim 1 wherein:
each said first recess receives only a single said key.

15. The joint of claim 1 wherein:
each ceramic key is secured in the associated first recess.

16. The joint of claim 1, wherein:
each ceramic key is secured in the associated first recess by a ceramic adhesive.

17. The joint of claim 1, wherein:
each ceramic key has at least one machined facet.

18. The joint of claim 17, wherein:
the machined facet contacts the second member.

19. The joint of claim 1 wherein:
the first member is annular.

20. The joint of claim 1 wherein:
the first member is radially retained to the second member at the joint at least partially via hoop stress of the first member.

21. The joint of claim 1 wherein:
there is a radial gap between the first member and the second member; and
each ceramic key spans the radial gap.

22. The joint of claim 1 wherein:
each ceramic key exerts a radial force on the CMC substrate responsive to axial force tending to separate the first member from the second member in the first direction.

23. A joint retaining a first member to a second member to resist separation in a first direction, the joint comprising:
a first recess in the first member, the first member comprising at least a fiber-reinforced ceramic matrix composite (CMC) substrate; and
at least one ceramic key partially accommodated in the first recess and engaging the second member to resist said separation, the second member comprising at least a metallic substrate,
wherein:
the first member is a main body of a can-type combustor and the joint is along an outboard face of the main body;
the first member and the second member encircle an axis;
there are a circumferential array of said first recesses;
there are a circumferential array of said ceramic keys, each partially accommodated in a respective associated said first recess;
said ceramic keys radially position the second member relative to the first member; and
said ceramic keys are spring biased into engagement with the associated recesses.

* * * * *